United States Patent
Henry et al.

[11] 3,953,730
[45] Apr. 27, 1976

[54] OPTICAL READING HEAD

[75] Inventors: Guy Henry; Paul Roman; Claude Tetevuide, all of Paris, France

[73] Assignee: Thomson-CSF Visualisation et Traitement des Informations (T-VT), Paris, France

[22] Filed: June 24, 1974

[21] Appl. No.: 482,741

[30] Foreign Application Priority Data
July 3, 1973 France .................. 73.24391

[52] U.S. Cl. .................. 250/227; 250/566; 350/96 B
[51] Int. Cl.² .................. G02B 5/16
[58] Field of Search .................. 350/96 B, 96 R; 250/227, 216, 566; 235/61.11 E; 178/DIG. 2

[56] References Cited
UNITED STATES PATENTS

| | | | |
|---|---|---|---|
| 3,105,908 | 10/1963 | Burkhardt et al. | 235/61.11 E |
| 3,384,755 | 5/1968 | Williamson et al. | 350/96 B |
| 3,504,984 | 4/1970 | Bush | 350/96 B |
| 3,512,861 | 5/1970 | Schackert | 350/96 B |
| 3,533,657 | 10/1970 | Da Silva | 350/96 B |

OTHER PUBLICATIONS

*Concepts of Classical Optics*, by Strong, Appendix N, "Fiberoptics", by Narinder S. Kapany, pp. 565-566, published 1958.
Tompkins, IBM Tech. Disclosure Bulletin, Vol. 16, No. 9, Feb., 1974, p. 2791.

Primary Examiner—John K. Corsin
Assistant Examiner—Jon W. Henry
Attorney, Agent, or Firm—Karl F. Ross; Herbert Dubno

[57] ABSTRACT

An optical reading head is described which is particularly designed to read codes generally formed by fluorescent or phosphorescent bars. The codes are carried by a support, such as an envelope which moves past the head at a relatively high speed. The support carrying the code is illuminated from a light source through a set of outgoing optical fibers, and the modulated light retransmitted by the code markings is conveyed through a set of incoming optical fibers to a processing device. Such a reading head is particularly adapted for use in a postal sorting system.

2 Claims, 4 Drawing Figures

OPTICAL READING HEAD

The present invention relates to an optical reading head for the scanning of binary codes formed by phosphorescent or fluorescent markings, such as those used in postal sorting apparatus, the markings being carried in that instance on letter envelopes where they form part of the address.

A considerable increase is being experienced at the present time in the number of packages and in particular in the number of letters sent by mail, with the result that the postal authorities have begun to study apparatus which will enable an appreciable reduction of the time spent by clerks in sorting letters. Such apparatus needs to be automatic and to have a high throughput and furthermore should possess a certain degree of reliability in order to prevent errors from occurring in the distribution of the letters being sorted.

In an effective postal sorting system, in which the addresses carried by the letters are to be read by automatic equipment, these addresses are advantageously coded in binary form. It is therefore necessary for the system to incorporate a device capable of rapidly reading the address code on the envelopes of letters which move past at what may be a considerable speed.

An object of the present invention is thus to provide efficient means for reading the codes carried by envelopes which pass in front thereof.

Optical reading heads are known which are capable of reading the address codes carried by envelopes or any other article subjected to postal sorting, specifically codes formed by indexed lines, with the aid of optical systems using lenses on both the transmission and receiving sides. These systems illuminate the envelopes and subsequently convey retransmitted or reflected light, which has been modulated by the code carried on the envelope, to ancillary decoding devices.

Optical reading heads of this type are, however, clumsy and complex.

A more particular object of the present invention is therefore to provide a simplified optical reading head for postal sorting.

In accordance with our present invention, two sets of optical fibers extend to a front face of a reading head adjacent a guidepath along which a succession of address carriers move past that head at high speed, the fibers of the first set (referred to hereinafter as outgoing fibers) transmitting light from a source of preferably monochromatic radiation to that face for exciting a succession of photoluminescent (phosphorescent or fluorescent) code markings on each carrier while the fibers of the second set (referred to hereinafter as incoming fibers) pick up the resulting secondary rays from these markings in order to convey same to a processor for decoding. The light-guiding structure forms a ridge with two lands flanking an indentation, with the outgoing fibers terminating at the ridge and the incoming fibers terminating at the indentation. Thus, the secondary rays emitted by the code markings reach the confronting ends of the incoming fibers only for a short period during which these markings pass the indentation whose width in the direction of carrier motion, accordingly, determines the degree of resolution, i.e. the permissible minimum spacing of the markings on the carrier.

The invention will now be further described, by way of example, with reference to the accompanying drawing, in which.

In order that the differences and advantages provided by the reading head according to the invention in comparison with conventional heads may be better appreciated, a brief description of a reading head according to the prior art will be given with reference to FIG. 1.

Figure 1:
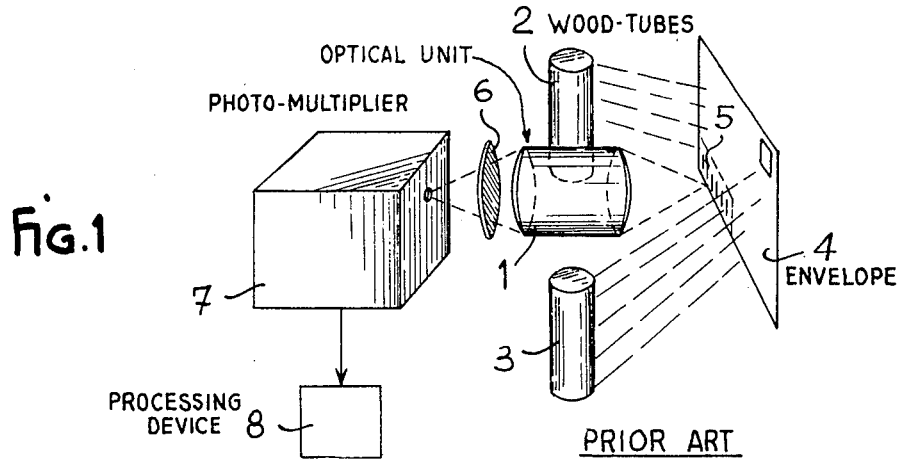
FIG. 1 is an exploded perspective view of a prior-art reading head.

In essence, the known head shown in FIG. 1 comprises two so-called Wood tubes 2 and 3 which are respectively situated on either side of an optical unit 1 and which emit ultra-violet light of around 3650 A. This light impinges on an envelope 4 which carries in a lower corner an address code 5 formed by fluorescent or phosphorescent lines of a certain color re-emitting light at a wavelength which is usually different from that of the incident light. The envelopes are of course guided, by mechanical, pneumatic or other means not shown, so that they are presented in the correct way before the reading head 1, 2.

The optical unit 1, which is positioned so as to receive the light re-emitted by the code markings 5 carried on the envelope, is formed by a group of generally complex lenses focusing the image of the code markings into a spot of light which is projected onto a detection system via a filter 6 passing the wavelength of the re-emitted light. A photo-multiplier 7 converts the received light into a current which represents the information given by the code and which is transmitted to a processing device 8.

The drawbacks of such a reading head are as follows: The optical unit is complex since it generally must include a certain number of lenses whose production is difficult and requires a great deal of care.

Figure 2:
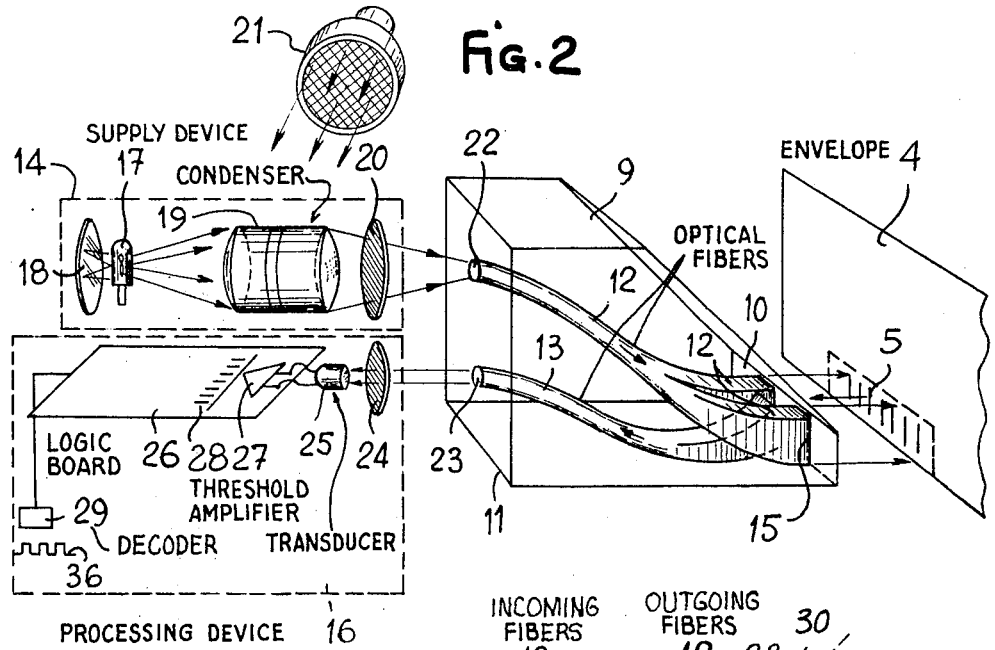
FIG. 2 is an exploded perspective view of a reading head and associated elements embodying our present invention.

FIG. 2 shows a reading head according to the invention. In essence, it comprises a unit 9 illustrated as a transparent block with a narrow front face 10 having a rectangular opening 15 confronting the envelopes 4 which pass before it, the envelopes being moved by mechanical, pneumatic or other means which will not be described since they are not part of the invention.

In its lower left-hand corner the envelopes carry an is formed, in the example described, by fluorescent lines having a specific height, width and spacing.

The larger rear surface of unit 9 faces a device 14 which supplies the system with light and a device 16 which processes the light re-emitted by the excited code markings 5.

Unit 9 containing two sets of optical fibers 12 and 13, the first set serving to transmit light from device 14 to the envelopes and the second set to convey the re-emitted radiation to device 16. In the embodiment described, the set of fibers 12 is divided into two bundles transmitting light with a wavelength of 4200A from the supply device 14 to the opening 15 at spaced-apart locations thereof. An intermediate fiber bundle 13 serves to pick up the light emitted by the fluorescent lines of address code 5 on an envelope 4.

By way of example, the supply device 14 contains a light source 17 formed by an iodine lamp situated in front of a mirror 18. A condenser 19 cooled by a fan 21 is positioned in the path of the emitted light to focus the light rays, through a filter 20 which in the embodiment described is blue, onto the entrance ends of the outgoing fibers 12 which terminate at the rear face 11 of unit 9. The condenser contains an anti-heat filter 190 blocking infra-red rays to prevent the detection of radiation acting as background noise.

The processing device 16 contains, an optical filter 24 which confronts the proximal ends 23 of the incoming fibers 13 and passes the wavelength of the light emitted by the lines 5 on the envelope 4 whose address is to be decoded. This filter 24 is followed by a transducer 25 which transforms the received light into a current fed to a logic board 26. A threshold amplifier 27 and a logic circuit 28 on that board serve to filter the signal generated by the fluorescent lines forming the code 5 and to suppress any interference signals. The output of the logic circuit is connected to a decoder 29 for controlling the routing of the envelopes in a manner known per se and not described in detail.

Figure 3:
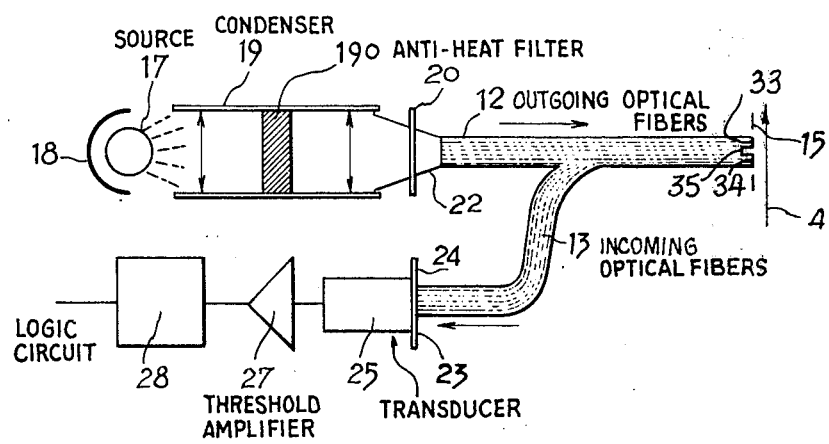
FIG. 3 is a view from above of the assembly shown in FIG. 2.

In FIG. 3 the position of the envelopes and the direction in which they move past the opening 15 are represented by an arrow 4.

The optical condenser 19 together with filter 190 and mirror 18 could be replaced by a light guide made from heat-absorbing glass.

The wavelengths mentioned above are not critical but are dictated by the inks or other dyestuffs currently available for writing the codes on the envelope.

Thus, in the embodiment selected, the outgoing fibers 12 convey light of wavelength 4200 A which is used to cause fluorescence of the index lines 5 which are scanned by this reading head. On the other hand, the incoming fibers 13 transmit a mixture of light rays at a plurality of wavelengths, specifically rays of 4200A due to a residual amount of exciting light which may have been imperfectly filtered, rays of 4400 A corresponding to the emitting wavelength of the paper forming the envelope, and rays of 5800 A which is the wavelength of the light emitted by the fluorescent lines 5. We therefore use a filter 24 passing the wavelength of 5800 A in front of the output ends 23 of incoming fibers 13.

The fibers are so disposed as to obviate, as far as possible, the effects of envelopes being positioned at the wrong level or at an angle in front of the opening 15 of the reading head, which could hamper the decoding. To this end, both the outgoing and the incoming fiber bundles are of rectangular cross-section; in the case of the former the minor dimension of the rectangle is proportional to the strength with which the fluorescent lines are to be illuminated, whereas in the case of the latter it is inversely proportional to the resolving power to be achieved.

The major cross-sectional dimension of the fiber bundles depends on the maximum possible excursions of the position of a fluorescent code line from a normal head. These positional variations, which are shown at 30, 31 and 32 in FIG. 4, are due to the fact that the guides along which the envelope pass allow the envelopes to slide up and down to a certain extent.

In the present example, the minor dimension is of the order of 0.4 mm and the major dimension is of the order of 18 mm.

Figure 4:
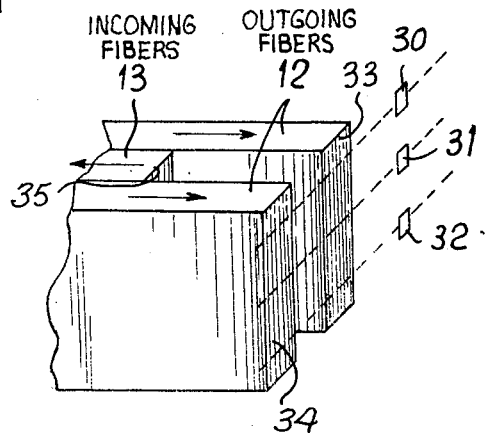
FIG. 4 is a view of an array of optical fibers included in our improved reading head.

As best seen in FIG. 4, the light-guiding structure comprising the fiber bundles 12 and 13 forms a ridge with two lands 33, 34 separated by an indentation 35, the outgoing fibers 12 terminating at these lands whereas the incoming fibers 13 terminate at the bottom of the indentation. Thus, the extremities of fibers 12 shield the ends of fibers 13 from the secondary rays emitted by code markings 5 except during the short period when these markings pass between the lands 33 and 34. With the direction of motion indicated in FIG. 3, the fiber bundle terminating at land 33 is effective to excite these photoluminescent markings before they reach the pick-up position; if the movement were reversed, the other bundle 12 would have that effect. Thus, our illustrated system enables the scanning of code carriers 4 moving from left to right or from right to left. The current delivered to decoder 29 (FIG. 2) is a train of pulses 36 whose relative time positions correspond to the spatial positions of lines 5 on envelope 4, as determined by the light pulses conveyed by the fibers 13 to the photoelectric transducer 25. The effect of this arrangement is to increase the power of resolution of the device.

What is claimed is:

1. A device for the reading of photoluminescent code markings spacedly disposed on a carrier moving along a predetermined guidepath, comprising:
   a source of radiation for exciting said code markings;
   a light-guiding structure including a first and a second set of optical fibers, said structure forming a ridge adjacent said guidepath with a pair of lands separated by an indentation, said first set of fibers being split into two outer bundles each terminating at one of said lands for illuminating said code markings with said radiation, said second set of fibers forming an inner bundle of rectangular cross-section flanked by said outer bundles along the major sides of said cross-section, the fibers of said inner bundle having ends directly exposed to incident light and terminating at said indentation for picking up secondary light rays from said code markings only upon movement thereof past said indentation while being shielded by said outer bundles from code markings offset from said indentation;
   photoelectric transducer means positioned to receive said secondary rays from said second set of fibers for converting same into electrical signals; and
   decoding means for said signals connected to said transducer means.

2. In a postal sorting system for pieces of mail bearing addresses constituted by photoluminescent code markings spacedly disposed thereon, in combination:
   a guidepath for a succession of said pieces of mail movable therealong at high speed;
   a source of radiation for exciting said code markings;
   a light-guiding structure including a first and a second set of optical fibers, said structure forming a ridge adjacent said guidepath with a pair of lands separated by an indentation, said first set of fibers being split into two outer bundles each terminating at one of said lands for illuminating said code markings with said radiation, said second set of fibers forming an inner bundle of rectangular cross-section flanked by said outer bundles along the major sides of said cross-section, the fibers of said inner bundle having ends directly exposed to incident light and terminating at said indentation for picking up secondary light rays from said code markings only upon movement thereof past said indentation while being shielded by said outer bundles from code markings offset from said indentation;
photoelectric transducer means positioned to receive said secondary rays from said second set of fibers for converting same into electrical signals; and
decoding means for said signals connected to said transducer means.

* * * * *